US008803664B2

(12) United States Patent
Ninomiya

(10) Patent No.: US 8,803,664 B2
(45) Date of Patent: Aug. 12, 2014

(54) RADIO WAVE CONTROL APPARATUS, RADIO WAVE CONTROL SYSTEM, AND RADIO WAVE CONTROL METHOD

(75) Inventor: Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1014 days.

(21) Appl. No.: 12/782,906

(22) Filed: May 19, 2010

(65) Prior Publication Data

US 2010/0308977 A1    Dec. 9, 2010

(30) Foreign Application Priority Data

Jun. 5, 2009  (JP) ................................. 2009-136715

(51) Int. Cl.
*H04Q 5/22* (2006.01)
*G05B 11/01* (2006.01)
*G08C 19/16* (2006.01)
*G08C 19/12* (2006.01)
*H04B 5/02* (2006.01)
*H04B 7/06* (2006.01)

(52) U.S. Cl.
CPC ................ *H04B 7/0617* (2013.01); *H04B 5/02* (2013.01)
USPC ....... 340/10.5; 340/10.1; 340/10.2; 340/10.4; 340/12.51; 340/13.26; 340/13.24; 340/13.25

(58) Field of Classification Search
CPC ............ G06K 7/0008; G06K 7/10079; G06K 7/10346; G06K 7/10356; H01Q 1/2216; G08B 13/2417; H04B 7/0408; H04B 5/0062; H04B 7/0617; H04Q 2209/47; B65D 2203/10; H04L 1/0016
USPC ........ 340/10.1–10.6, 12.5–12.55, 13.2–13.29
See application file for complete search history.

(56) References Cited

U.S. PATENT DOCUMENTS

| 5,726,630 | A | * | 3/1998 | Marsh et al. ................ 340/10.2 |
| 5,774,795 | A | * | 6/1998 | Ando ............................ 455/106 |
| 6,009,124 | A | * | 12/1999 | Smith et al. ................... 375/267 |
| 6,229,486 | B1 | * | 5/2001 | Krile ..................... 343/700 MS |

(Continued)

FOREIGN PATENT DOCUMENTS

| EP | 1 487 126 | 12/2004 |
| JP | 2005-328452 | 11/2005 |

(Continued)

OTHER PUBLICATIONS

Japanese Office Action dated Apr. 23, 2013, from corresponding Japanese Application No. 2009-136715.

(Continued)

*Primary Examiner* — Steven Lim
*Assistant Examiner* — Muhammad Adnan
(74) *Attorney, Agent, or Firm* — Katten Muchin Rosenman LLP

(57) ABSTRACT

A radio wave control apparatus includes a detecting unit that detects an object, other than a communication target device, in a radiation range to which a radio wave radiating unit radiates predetermined radio waves in each of a plurality of radiation directions; and a radiation range determining unit that determines a radiation range in each of the radiation directions such that the predetermined radio waves are radiated over a predetermined communication range, in which the communication target device is communicable using the predetermined radio waves, and no no-communication area that is caused when the predetermined radio waves reflected on the object is caused in the communication range.

12 Claims, 10 Drawing Sheets

(56) References Cited

U.S. PATENT DOCUMENTS

| | | | |
|---|---|---|---|
| 6,646,620 B1* | 11/2003 | Bjornholt et al. | 343/882 |
| 6,728,554 B1* | 4/2004 | Wegner | 455/562.1 |
| 6,925,567 B1 | 8/2005 | Hirata | |
| 7,183,922 B2* | 2/2007 | Mendolia et al. | 340/572.1 |
| 7,860,535 B2* | 12/2010 | Kuramoto et al. | 455/562.1 |
| 8,174,391 B2* | 5/2012 | Sandler et al. | 340/572.7 |
| 8,390,458 B2* | 3/2013 | Nonaka et al. | 340/572.7 |
| 8,461,966 B2* | 6/2013 | Tuttle | 340/10.4 |
| 2003/0157897 A1* | 8/2003 | Maeda et al. | 455/67.3 |
| 2006/0001585 A1* | 1/2006 | Saito et al. | 343/754 |
| 2006/0183503 A1* | 8/2006 | Goldberg | 455/561 |
| 2007/0037529 A1* | 2/2007 | Nagai et al. | 455/101 |
| 2009/0295545 A1* | 12/2009 | O'Haire et al. | 340/10.5 |

FOREIGN PATENT DOCUMENTS

| | | |
|---|---|---|
| JP | 2006-20083 | 1/2006 |
| JP | 2006-293461 | 10/2006 |
| JP | 2008-090796 | 4/2008 |
| JP | 2008-182717 | 8/2008 |
| JP | 2008-289192 | 11/2008 |

OTHER PUBLICATIONS

Taiwanese Office Action dated Feb. 17, 2014 for Taiwan Application No. 099118163.

* cited by examiner

RADIO WAVE CONTROL APPARATUS, RADIO WAVE CONTROL SYSTEM, AND RADIO WAVE CONTROL METHOD

CROSS-REFERENCE TO RELATED APPLICATION(S)

This application is based upon and claims the benefit of priority of the prior Japanese Patent Application No. 2009-136715, filed on Jun. 5, 2009, the entire contents of which are incorporated herein by reference.

FIELD

The embodiments discussed herein are directed to a radio wave control apparatus, a radio wave control system, and a radio wave control method.

BACKGROUND

In recent years, systems have been used in which communications are established with radio communication devices, such as radio frequency IDentification (RFID) tags, non-contact integrated circuit (IC) cards, and portable terminal devices (mobile phones or personal digital assistants (PDA)) via a reader/writer and an antenna at, for example, an access point. For example, a goods identification system and a management system that use RFID tags are commonly used in various fields. RFID is a technology in which a tag and a reader/writer communicate with each other using radio communications using radio waves, i.e., electromagnetic waves, to identify and manage persons or goods.

For communications with an RFID tag, a non-directional antenna having a wide radio wave radiation angle, for example, is generally used. FIG. 12 is an explanatory view of a radio wave control system using a non-directional antenna. In the radio wave control system represented in FIG. 12, a no-communication area in which the non-directional antenna cannot communicate with the RFID tag (for example, a "null point" is included) may be caused in the communication area due to something called multipath interference, in which a direct wave BW from the non-directional antenna and a reflected wave aW, which is reflected on the floor surface, interfere with each other.

To reduce the effect of multipath interference, radio wave control systems using a variable beam antenna that has high directionality are used. FIG. 13 is an explanatory view of a radio wave control system using a variable beam antenna. In the radio wave control system represented in FIG. 13, a communication area in one radiation direction is narrow in which the variable beam antenna radiates beams. Therefore, selecting a radiation direction in consideration of wave reflections from the floor surface and the ceiling leads to a tendency that no no-communication area is caused in the communication area and the effect of multipath interference is prevented.

Technologies have been also disclosed in which such a variable beam antenna radiates radio waves such that the radio waves intersect with the floor surface, which is the reflection surface from which the strongest reflected waves are generated, thereby to reduce the occurrence of no-communication areas (see, for example, Japanese Laid-open Patent Publication No. 2006-20083).

However, a beam antenna having high directionality cannot efficiently communicate with an RFID tag even under the circumstances where no no-communication areas are caused in the area in which the beam antenna communicates with the RFID tag.

Specifically, the beam antenna having high directionality sequentially changes at different timing the direction in which the beam antenna radiates radio waves. Thus, in order to radiate radio waves over the entire area in which the beam antenna communicates with the RFID tag, the time that meets the number of radiation directions is required. When an RFID tag is moving in the communication area, data is sometimes inadequately read and thus efficient communications with the RFID tag cannot be established.

When the beam antenna having high directionality communicates with the RFID tag, radio waves may be radiated at maximum power all the time in order to extend the communication area. However, it is preferable that the power with which radio waves are radiated be as small as possible in consideration of the effect of interference on other neighboring RF ID systems. This problem similarly arises in systems, other than the RFID system, in which communications with radio communication devices are established.

SUMMARY

According to an aspect of an embodiment of the invention, a radio wave control apparatus includes a detecting unit that detects an object, other than a communication target device, in a radiation range to which a radio wave radiating unit radiates predetermined radio waves in each of a plurality of radiation directions, and a radiation range determining unit that determines a radiation range in each of the radiation directions such that the predetermined radio waves are radiated over a predetermined communication range in which the communication target device is communicable using the predetermined radio waves, and no no-communication area that is caused when the predetermined radio waves reflected on the object is caused in the communication range.

According to another aspect of an embodiment of the invention, a radio wave control system includes an antenna that radiates predetermined radio waves in a plurality of radiation directions, a radio wave control apparatus that is connected to the antenna, and a measuring device that is connected to the radio wave control apparatus and measures a distance to an object, wherein the radio wave control apparatus includes a detecting unit that detects an object, other than a communication target device, in a radiation range to which the antenna radiates the predetermined radio waves in each of a the radiation directions, and a radiation range determining unit that determines a radiation range in each of the radiation directions such that no no-communication area that is caused when the predetermined radio waves are radiated over a predetermined communication range, in which the communication target device is communicable via the predetermined radio waves, and the predetermined radio waves reflected on the object is caused in the communication range.

According to still another aspect of an embodiment of the invention, a radio wave control method includes detecting an object, other than a communication target device, in a radiation range to which a radio wave radiating unit radiates predetermined radio waves in each of a plurality of radiation directions, and determining a radiation range in each of the radiation directions such that the predetermined radio waves are radiated over a predetermined communication range in which the communication target device is communicable using the predetermined radio waves, and no no-communication area that is caused when the predetermined radio waves reflected on the object is caused in the communication range.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The embodiments do not limit the present invention.

[a] First Embodiment

Figure 1:
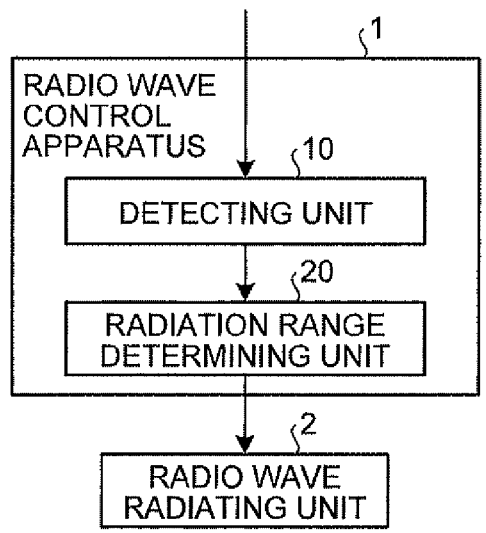
FIG. 1 is a function block diagram of a configuration of a radio wave control apparatus according to a first embodiment of the present invention.

FIG. 1 is a function block diagram of a configuration of a radio wave control apparatus according to an embodiment of the present invention. As represented in FIG. 1, a radio wave control apparatus 1 is connected to a radio wave radiating unit 2 having high directionality, and controls the radio wave radiating unit 2. The radio wave control apparatus 1 includes a detecting unit 10 and a radiation range determining unit 20. The radio wave radiating unit 2 is, for example, a beam antenna.

The detecting unit 10 detects an object, other than a communication target device, in the radiation range of the radio wave radiating unit 2 that radiates radio waves in each of a plurality of radiation directions.

Figure 2:
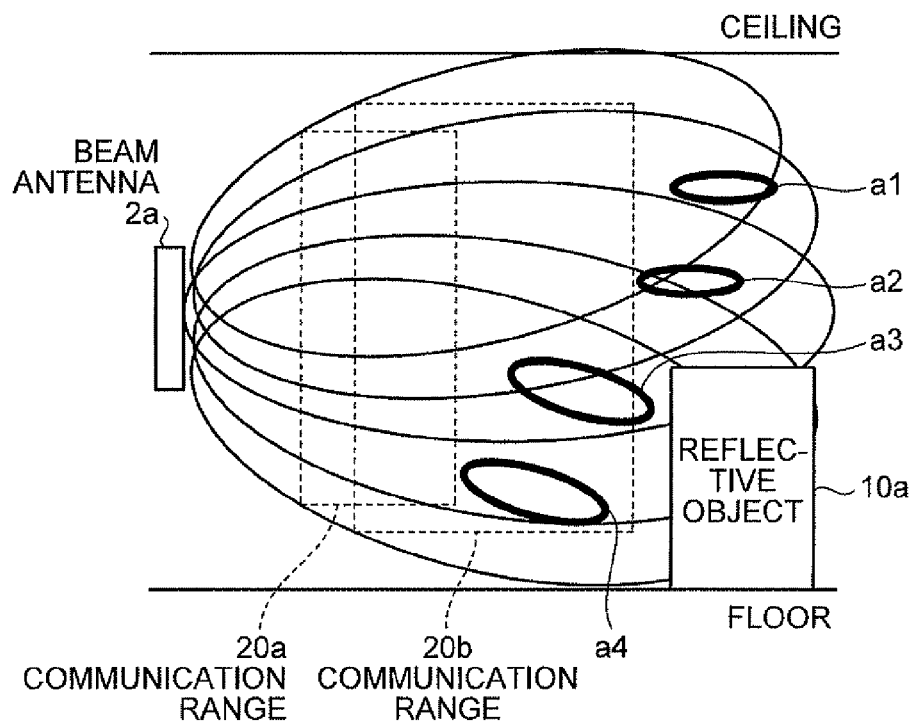
FIG. 2 is a diagram representing that no-communication areas are caused by a reflective object.

If an object is present in the radiation ranges in the radio wave radiation directions, no-communication areas (i.e., areas where the radio wave radiating unit is incommunicable with the communication target device; for example, a "null point" is included) may be caused in the radiation ranges due to reflections of the radio waves from the object. A case is explained below where no-communication areas are caused by an object that is present in the radiation ranges in the radio wave radiation directions. FIG. 2 is a diagram representing a case where no-communication areas are caused by an object (reflective object). In the radio wave control system represented in FIG. 2, if a reflective object 10a is present in the radiation ranges in the directions in which radio waves are emitted from a beam antenna 2a, multipath interference occurs due to the reflected waves that are reflected on the reflective object 10a and the direct waves. In areas a1 to a4 where the multipath interference occurs and the intensity of the radio waves accordingly lowers, the beam antenna 2a cannot communicate with a communication target device.

For example, the no-communication areas a3 and a4 are caused in a communication range 20b between the communication target device and the beam antenna 2a, so that the beam antenna 2a may not communicate with the communication target device. On the other hand, no no-communication area is caused in a communication range 20a between the communication target device and the beam antenna 2a, so that the beam antenna 2a can communicate with the communication target device.

In order to confirm that no no-communication area is caused in the communication range between the beam antenna 2a and the communication target device, whether there is an object in the radiation ranges in the radio wave radiation directions is previously detected.

The communication target device is a communication device that the radio wave radiating unit 2 is to communicate with and is, for example, an RFID tag. The radio waves may be in a UHF band of 953 MHz or a microwave band of 2.45 GHz. However, the band is not limited to the above bands. In addition, radio waves may be replaced with electromagnetic waves.

The radiation range determining unit 20 determines radiation ranges in the respective radiation directions such that radio waves are radiated over the entire communication range in which the radio wave radiating unit 2 is communicable with the communication target device using radio waves, and that no no-communication area, which is caused when the radio waves are reflected on the object detected by the detecting unit 10, is caused in the communication range.

By determining, for example, whether to employ a radio wave radiation direction such that no no-communication area is caused, the radio wave control apparatus 1 swiftly shifts the radio wave radiating unit 2 to the radiation direction in which the radio wave radiating unit 2 is communicable with the communication target device. This allows the radio wave radiating unit 2 to efficiently communicate with the communication target device.

By, for example, determining radio wave outputs with respect to the respective radiation directions such that no no-communication area is caused, the radio wave control apparatus 1 can inhibit interference of the radio waves in the respective radiation directions to the radiation ranges of other beam antennae. This achieves efficient communications while inhibiting the effect of multipath interference to other neighboring radio wave radiating units 2.

[b] Second Embodiment

The radio wave control apparatus 1 according to the first embodiment is explained regarding the case where it controls the radio wave radiating unit 2 that communicates with the communication target device. Alternatively, the radio wave control apparatus 1 may control a beam antenna that communicates with an RFID tag.

In the second embodiment, a radio wave control system is explained in which the radio wave control apparatus 1 controls the beam antenna that communicates with an RFID tag.

Figure 3:
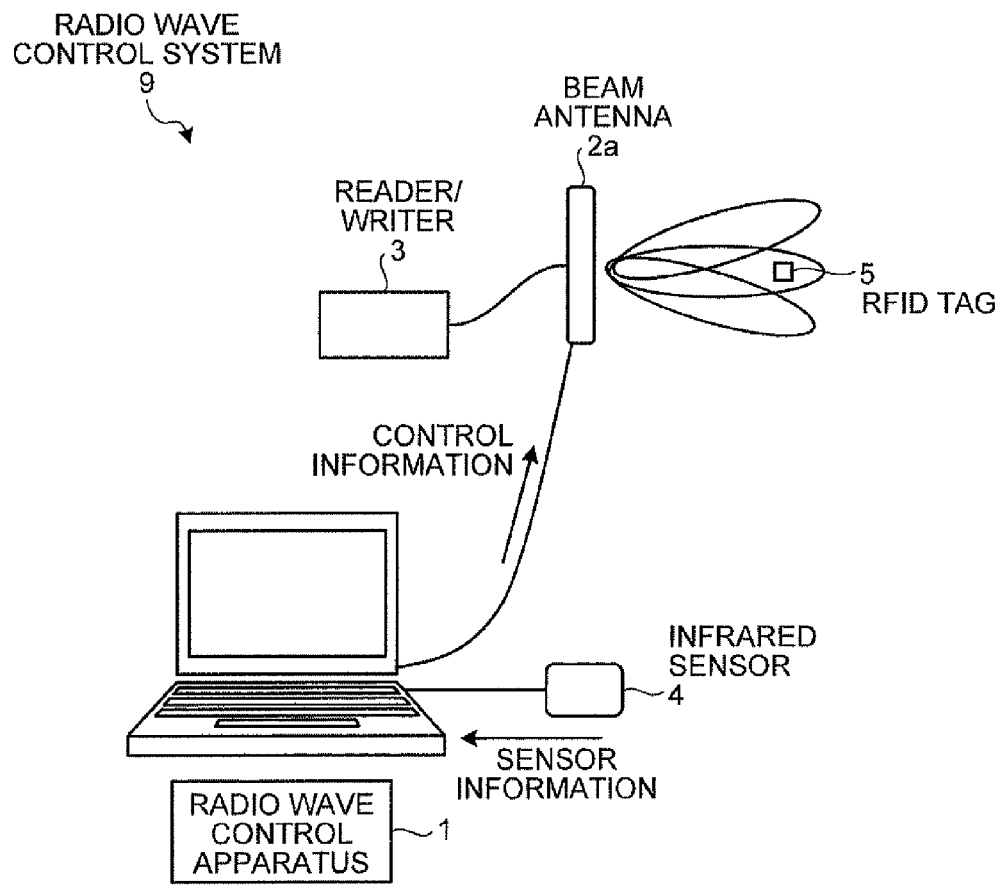
FIG. 3 is a diagram of a configuration of a radio wave control system according to a second embodiment of the present invention.

First, a configuration of a radio wave control system 9 that includes the radio wave control apparatus 1 according to the second embodiment is explained with reference to FIG. 3. FIG. 3 is a diagram of the configuration of the radio wave control system 9 according to the second embodiment.

The radio wave control system 9 includes the radio wave control apparatus 1, the beam antenna 2a, a reader/writer 3, and an infrared sensor 4.

The radio wave control apparatus 1 controls the beam antenna 2a that communicates with an RFID tag 5. Specifically, the radio wave control apparatus 1 detects, from the infrared sensor 4, sensor information including the distance from the beam antenna 2a to the reflective object 10a in the ranges in the radiation directions, in which radio waves are radiated from the beam antenna 2a. The reflective object 10a refers to an object without the RFID tag 5.

On the basis of the detected sensor information, the radio wave control apparatus 1 judges whether a range that is formed by combining radiation ranges of a plurality of radio wave radiation directions (hereinafter, "combined radiation range") includes a range in which the beam antenna 2a makes the RFID tag 5 communicable (hereinafter, "tag communication range") and whether no no-communication area is caused in the tag communication range. Determination on whether no no-communication area is caused in the tag communication range is made by, for example, calculating a field intensity distribution of the radio waves from the beam antenna 2a.

When it is judged that the combined radiation range covers the tag communication range and that no no-communication area is caused in the tag communication range, the radio wave control apparatus 1 determines radiation directions of the beam antenna 2a by removing radiation directions from the radiation directions such that no no-communication area is caused in the tag communication range. The radio wave control apparatus 1 sends the determined radiation directions as control information to the beam antenna 2a.

The radio wave control apparatus 1 determines radio wave outputs in the respective radiation directions by reducing the radio wave output in each of the radiation directions from the maximum value on a predetermined-value basis such that no no-communication area is caused. The radio wave control apparatus 1 sends the determined radio wave output values of the respective radiation directions as control information to the beam antenna 2a.

The radio wave control apparatus 1 may determine the radio wave outputs in the respective radiation directions by increasing the radio wave output in each of the radiation directions from the minimum value on a predetermined-value basis such that no no-communication area is caused in the tag communication range.

The beam antenna 2a is an antenna having variable directionality. The beam antenna 2a changes its radiation direction between the radiation directions at different timing and radiates radio waves in the changed radiation direction. Specifically, once the beam antenna 2a receives the control information from the radio wave control apparatus 1, the beam antenna 2a radiates radio waves in the radiation directions contained in the received control information. After the beam antenna 2a receives the control information from the radio wave control apparatus 1, the beam antenna 2a radiates radio waves in the radiation directions that are contained in the received control information. In addition, after the beam antenna 2a receives the control information from the radio wave control apparatus 1, it radiates radio waves in the respective radiation directions using the radio wave output values contained in the received control information.

The reader/writer 3 is connected to the beam antenna 2a and reads or writes data from or to the RFID tag 5 via the radio waves that are emitted by the beam antenna 2a.

Figure 4:
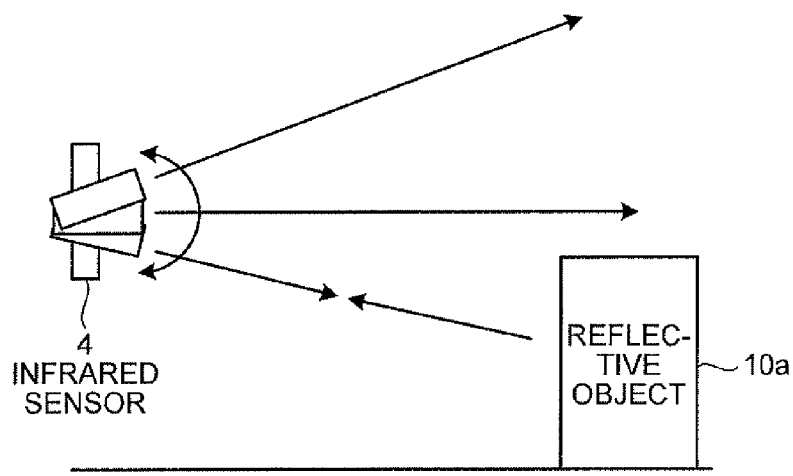
FIG. 4 is a diagram representing a method of measuring a distance to an object using infrared sensor.

The infrared sensor 4 is a distance sensor that measures the distance from the beam antenna 2a to the object within the radiation ranges in the radiation directions in which radio waves are radiated, using infrared light. The method of measuring the distance to the object (reflective object) using the infrared sensor is explained below. FIG. 4 is a diagram representing the method of measuring the distance to the object using the infrared sensor. The infrared sensor 4 represented in FIG. 4 radiates infrared light with a varied angle in which infrared light is radiated, receives the reflected waves that are reflected on the reflective object 10a, which is present in the radiation ranges in the radiation directions, to measure the distance from the beam antenna 2a to the reflective object 10a.

The distance sensor is explained as the infrared sensor 4. Alternatively, the distance sensor may be an ultrasonic sensor, a millimeter wave sensor, or an image sensor of, for example, a stereo camera or a monocular camera.

Figure 5:
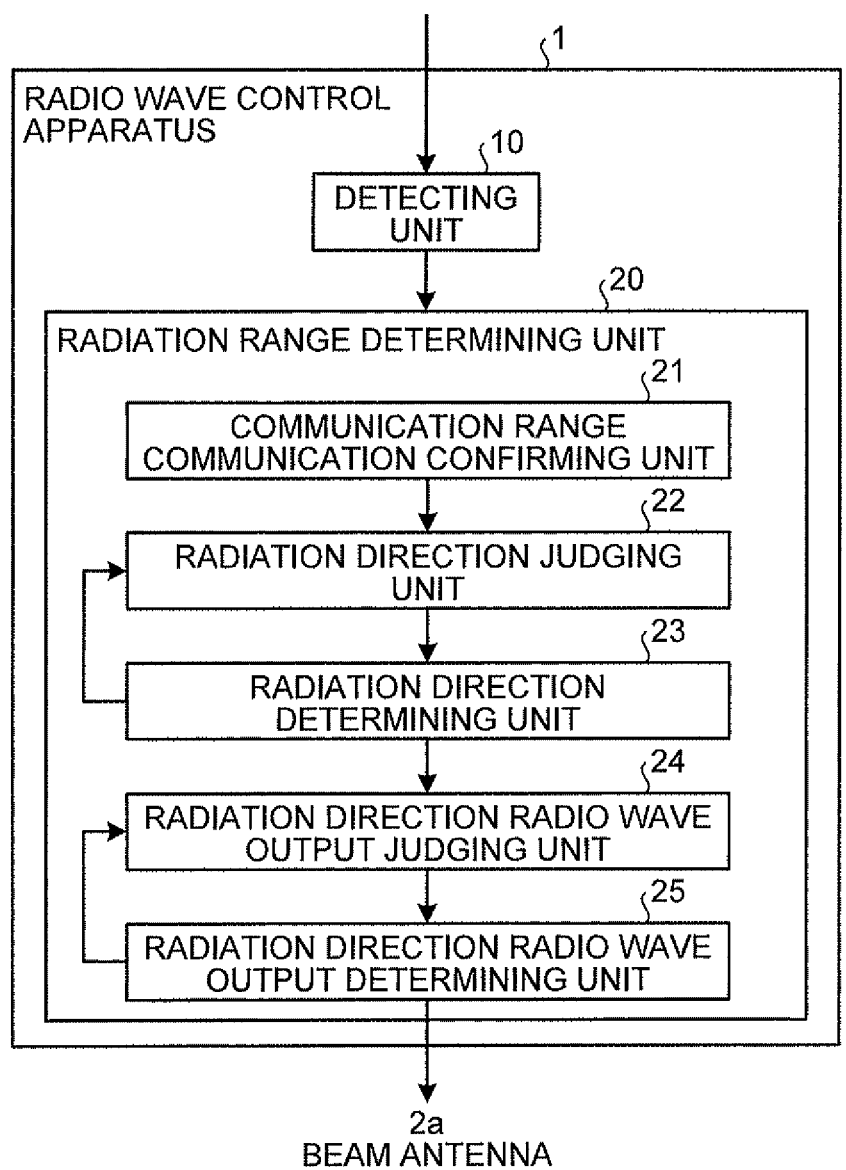
FIG. 5 is a function block diagram of a configuration of a radio wave control apparatus according to the second embodiment.

A configuration of the radio wave control apparatus 1 according to the second embodiment is explained below with reference to FIG. 5. FIG. 5 is a function block diagram of the configuration of the radio wave control apparatus 1 according to the second embodiment. By assigning the same numbers to the same elements as those of the radio wave control apparatus 1 represented in FIG. 1, the redundant explanation for the same elements and operations is omitted. The second embodiment is different from the first embodiment in that the radiation range determining unit 20 further includes a communication range communication confirming unit 21, a radiation direction judging unit 22, a radiation direction determining unit 23, a radiation direction radio wave output judging unit 24, and a radiation direction radio wave output determining unit 25.

The detecting unit 10 detects the reflective object 10a in the radiation ranges to which the beam antenna 2a radiates radio waves in each of the radiation directions. The detecting unit 10 performs substantially sequential scanning using the infrared sensor, and receives information on the position and shape of the reflective object 10a on the basis of the result of measuring the distance to the reflective object 10a or the floor surface.

On the basis of the information on the position and shape of the reflective object 10a, which are detected by the detecting unit 10, the communication range communication confirming unit 21 judges whether no no-communication area is caused in the tag communication range, in which the RFID tag 5 is communicable, in the combined radiation range of the beam antenna 2a that is formed of the radiation ranges in the radiation directions in which radio waves are radiated.

Specifically, in order to determine whether there is no no-communication area and its position with respect to each of the radiation directions in which radio waves are radiated, the communication range communication confirming unit 21 calculates the field intensity distribution of the radio waves, which are radiated from the beam antenna 2a, on the basis of the information on the position and shape of the reflective object 10a and the position and shape of other reflective objects, such as the floor surface and the ceiling, that is detected by the detecting unit 10. The communication range communication confirming unit 21 performs calculation with the maximum value of the radio wave output value in each of the radiation directions such that no no-communication area is caused as much as possible.

In order to obtain the position of a no-communication area in the combined radiation range, the communication range communication confirming unit 21 calculates a field intensity distribution of the combined radiation range, which is formed of the radiation ranges in the radiation directions, on the basis of the field intensity distributions that are calculated with respect to the respective radiation ranges. In addition, on the basis of the field intensity distribution of the combined radiation range, the communication range communication confirming unit 21 determines whether the combined radiation range covers the tag communication range and whether no no-communication area is caused in the tag communication range.

When it is judged that the combined radiation range covers the tag communication range and that no no-communication area is caused in the tag communication range, the communication range communication confirming unit 21 determines that the RFID tag 5 is communicable and sends a message urging determination of radiation directions to the radiation direction judging unit 22. In contrast, when it is judged that the combined radiation range does not cover the tag communication range, or that a no-communication area is caused in the tag communication range, the communication range communication confirming unit 21 displays, for example, the position of the no-communication area in the tag communication range to alert that there is a no-communication area.

The radiation direction judging unit 22 sequentially removes a radiation direction from the radiation directions, and judges whether no no-communication area is caused in the tag communication range after the removal.

Specifically, the radiation direction judging unit 22 sequentially removes radiation directions one by one, and calculates a field intensity distribution of a combined radiation range that is formed of the radiation ranges in the remaining radiation directions other than the removed radiation directions. Note that, when the radiation direction judging unit 22 receives a result or determination to remove a predetermining radiation direction from the radiation direction determining unit 23, when the radiation direction judging unit 22 calculates field intensity distributions of the radiation directions that remains after the predetermined radiation direction is removed from the radiation directions. On the basis of the calculated field intensity distribution of the combined radiation range, the radiation direction judging unit 22 judges whether the combined radiation range covers the tag communication range and whether no no-communication area is caused in the tag communication range, and sends the judgment result regarding the removed radiation directions to the radiation direction determining unit 23.

The radiation direction judging unit 22 sequentially removes radiation directions one by one from the radiation directions. Alternatively, any radiation directions having large overlapping radiation ranges out of the radiation directions may be preferentially removed, or the radiation range in a radiation direction may be removed two-dimensionally. Furthermore, the radiation direction judging unit 22 may remove radiation directions using an algorithm for solving an optimization problem.

The radiation direction determining unit 23 determines whether to remove the radiation directions on the basis of the judgment results regarding the removed radiation directions.

Specifically, when the judgment results regarding the removed radiation directions represents that the combined radiation range covers the tag communication range and that no no-communication area is caused in the tag communication range, the radiation direction determining unit 23 determines to remove the radiation directions. In contrast, when the judgment results regarding the removed radiation directions represents that the combined radiation range does not cover the tag communication range, or that a no-communication area is caused in the tag communication range, the radiation direction determining unit 23 determines not to remove the radiation directions.

When the radiation direction determining unit 23 has made determination on whether to remove a radiation direction with respect to not all of the radiation directions, the radiation direction determining unit 23 sends the result of the determination on whether to remove a radiation direction, which determination has been made, in order to urge the next judgment on the a radiation direction. In contrast, when the radiation direction determining unit 23 has determined whether to remove a radiation direction with respect to all of the radiation directions, the radiation direction determining unit 23 determines, as the radiation directions of the beam antenna 2a, the remaining radiation directions other than the directions determined to be removed from the radiation directions, and sends the remaining radiation directions to the radiation direction radio wave output judging unit 24.

In this manner, the radiation direction determining unit 23 determines optimum radiation directions that cause no no-communication area in the tag communication range.

The radiation direction radio wave output judging unit 24 reduces the radio wave output in each of the radiation directions from the maximum value step by step, and determines whether no no-communication area is caused in the tag communication range after the reduction.

Specifically, after the radiation direction radio wave output judging unit 24 receives all of the radiation directions, which are determined to be the radiation directions of the beam antenna 2a, the radiation direction radio wave output judging unit 24 selects radiation directions one by one from all of the radiation directions and reduces the radio wave output in the selected radiation direction from the maximum value step by step. The radio wave output is an intensity of radio waves. For example, one step may be 1 decibel (dB). If more fine adjustment is required, one step may be set to 0.5 dB. In contrast, if a rough adjustment is required, one step may be set to 3 dB. However, one step is not limited to the above values.

The radiation direction radio wave output judging unit 24 calculates a field intensity distribution of a combined radiation range that is formed of all of the radiation directions, using a reduced radio wave output value for the selected radiation direction, and using, for the remaining radiation directions other than the selected radiation direction, the maximum radio wave output value or a radio wave output value that is determined by the radiation direction radio wave output determining unit 25 to be described below.

On the basis of the calculated field intensity distribution of the combined radiation range, the radiation direction radio wave output judging unit 24 judges whether the combined radiation range covers the tag communication range and whether no no-communication area is caused in the tag communication range, and sends the judgment result regarding the selected radiation direction to the radiation direction radio wave output determining unit 25.

On the basis of the judgment result regarding the selected radiation direction, the radiation direction radio wave output determining unit 25 determines the radio wave output value in the selected radiation direction.

Specifically, when the judgment result regarding the selected radiation direction represents that the combined radiation range covers the tag communication range and that no no-communication area is caused in the tag communication range, there is a possibility that the radio wave output can be further reduced. Therefore, the radiation direction radio wave output determining unit 25 notifies the radiation direction radio wave output judging unit 24 that the radio wave output in the selected radiation direction is to be further reduced. In contrast, when the judgment result regarding the selected radiation direction represents that the combined radiation range does not cover the tag communication range, or that a no-communication area is caused in the tag communication range, the radiation direction radio wave output determining unit 25 determines the radio wave output value before the reduction as the radio wave output in the selected radiation direction. In other words, the minimum radio wave output about which it is determined that no no-communication area is caused in the tag communication range is the radio wave output value.

When the radiation direction radio wave output determining unit 25 has determined that radio wave outputs with respect not all of the radiation directions, the radiation direction radio wave output determining unit 25 sends the determined radio wave output value in the selected radiation direction to the radiation direction radio wave output judging unit 24. In contrast, when the radiation direction radio wave output determining unit 25 has determined radio wave outputs with respect to all of the radiation directions, the radiation direction radio wave output determining unit 25 sends the radio wave output values of all of the radiation directions, which are determined by the radiation direction determining unit 23, as control information to the beam antenna 2a.

Figure 6:
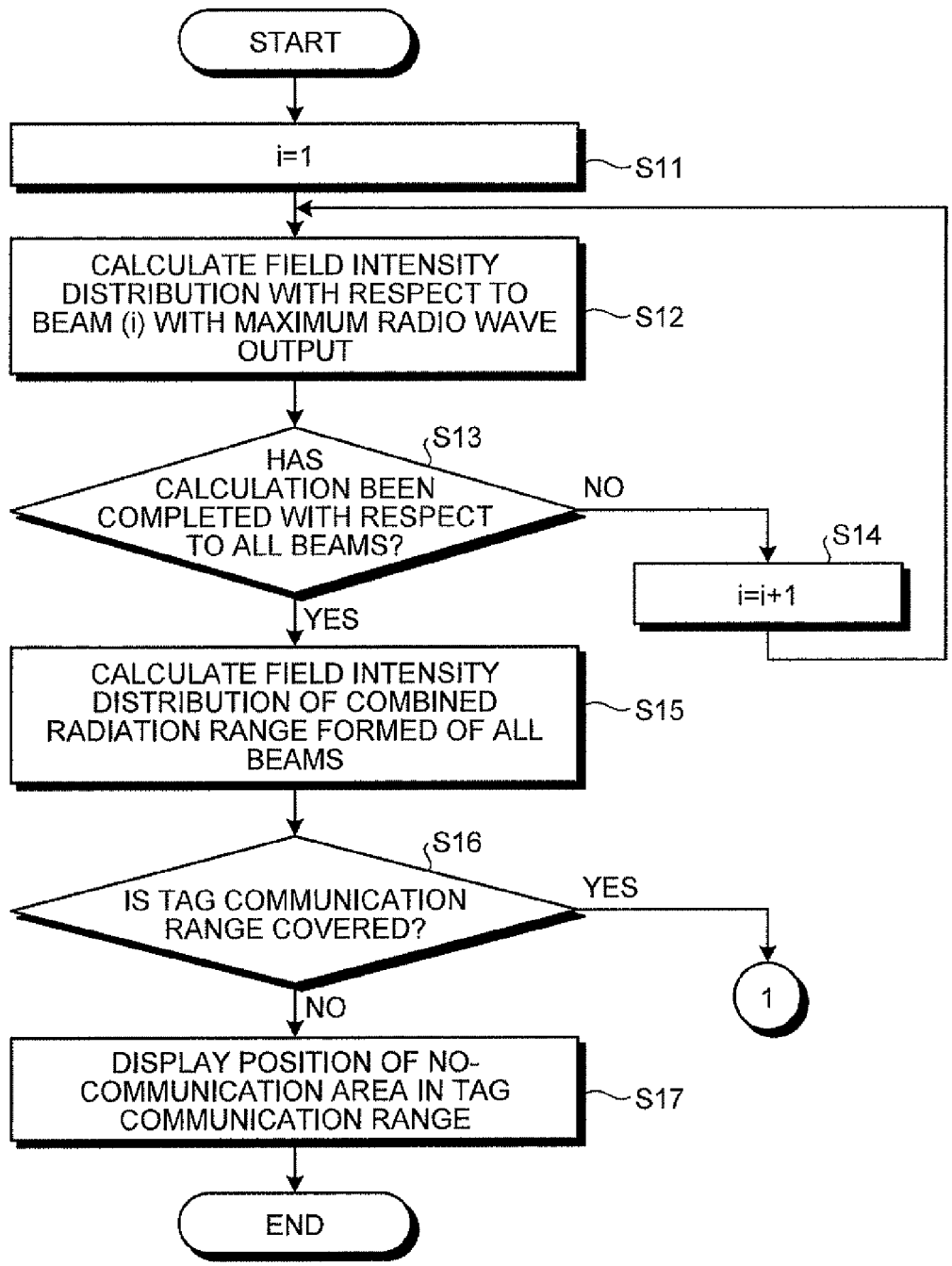
FIG. 6 is a flowchart of a process procedure of the radio wave control apparatus according to the second embodiment.

The process procedure of the radio wave control apparatus according to the second embodiment is explained below with reference to FIG. 6. FIG. 6 is a flowchart of the process procedure of the radio wave control apparatus 1 according to the second embodiment.

The communication range communication confirming unit 21 selects one of the radiation directions in which radio waves are radiated (step S11).

On the basis of the distance from the beam antenna 2a to the reflective object 10a, which is detected by the detecting unit 10, the communication range communication confirming unit 21 calculates a field intensity distribution of the radiation range in the selected radiation direction with the maximum radio wave output value (step S12).

Subsequently, the communication range communication confirming unit 21 judges whether field intensity distributions of all of the radiation directions have been calculated (step S13). When it is judged that the field intensity distributions of not all of the radiation directions have been calculated (NO at step S13), the communication range communication confirming unit 21 selects the next radiation direction (step S14) and goes to step S12.

In contrast, when it is judged that the field intensity distributions of all of the radiation directions have been calculated (YES at step S13), the communication range communication confirming unit 21 calculates a field intensity distribution of the combined radiation range, which is formed of the radiation ranges in the radiation directions, on the basis of the field intensity distributions of all of the radiation directions (step S15).

On the basis of the field intensity distribution of the combined radiation range, the communication range communication confirming unit 21 then judges whether the combined radiation range covers the tag communication range and whether no no-communication area is caused in the tag communication range (step S16). When it is judged that the combined radiation range does not cover the tag communication range, or that a no-communication area is caused in the tag communication range (NO at step S16), the communication range communication confirming unit 21 displays the position of the no-communication area in the tag communication range on a monitor (step S17) and completes the process.

When it is judged that the combined radiation range covers the tag communication range and that no no-communication area is caused in the tag communication range (YES at step S16) on the basis of the field intensity distribution of the combined radiation range, the communication range communication confirming unit 21 sends a message that urges determination of radiation directions to the radiation direction judging unit 22.

Figure 7:
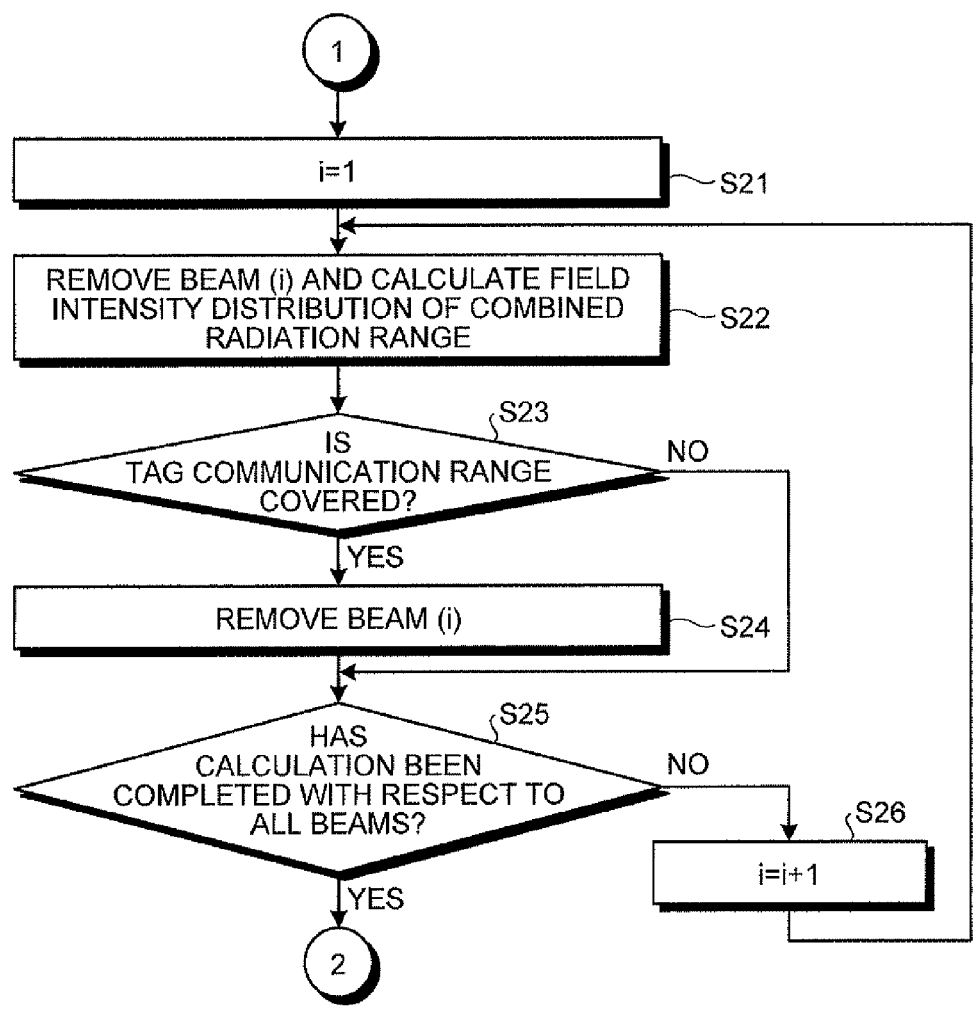
FIG. 7 is a flowchart of a process procedure of a radiation direction determining process according to the second embodiment.

The process procedure of the radiation direction determining process according to the second embodiment is explained below with reference to FIG. 7. FIG. 7 is a flowchart of the process procedure of the radiation direction determining process according to the second embodiment.

The radiation direction judging unit 22 that receives the message urging determination of radiation directions from the communication range communication confirming unit 21 selects one radiation direction from the radiation directions (step S21).

The radiation direction judging unit 22 then removes the selected radiation direction and the radiation direction that has been already determined to be removed, and calculates a field intensity distribution of a combined radiation range that is formed of the radiation ranges in the remaining radiation directions other than the removed radiation directions (step S22).

Subsequently, on the basis of the calculated field intensity distribution of the combined radiation range, the radiation direction judging unit 22 judges whether the combined radiation range covers the tag communication range and whether no no-communication area is caused in the tag communication range (step S23). When the combined radiation range covers the tag communication range and no no-communication area is caused in the tag communication range (YES at step S23), the radiation direction determining unit 23 determines to remove the selected radiation direction (step S24).

In contrast, when the combined radiation range does not cover the tag communication range or a no-communication area is caused in the tag communication range (NO at step S23), or after it is determined to remove the selected radiation direction, the radiation direction determining unit 23 judges whether calculation for determining whether to remove a radiation direction has been completed with respect to all of the radiation direction (step S25).

When it is judged that the calculation for determining whether to remove a radiation direction has been performed with respect to not all of the radiation directions (NO at step S25), the radiation direction determining unit 23 selects the next radiation direction (step S26) and goes to step S22.

When it is judged that the calculation for determining whether to reduce a radiation direction has been performed with respect to all of the radiation direction (YES at step S25), the radiation direction determining unit 23 sends the remaining radiation directions other than the radiation direction that has been determined to be removed to the radiation direction radio wave output judging unit 24.

Figure 8:
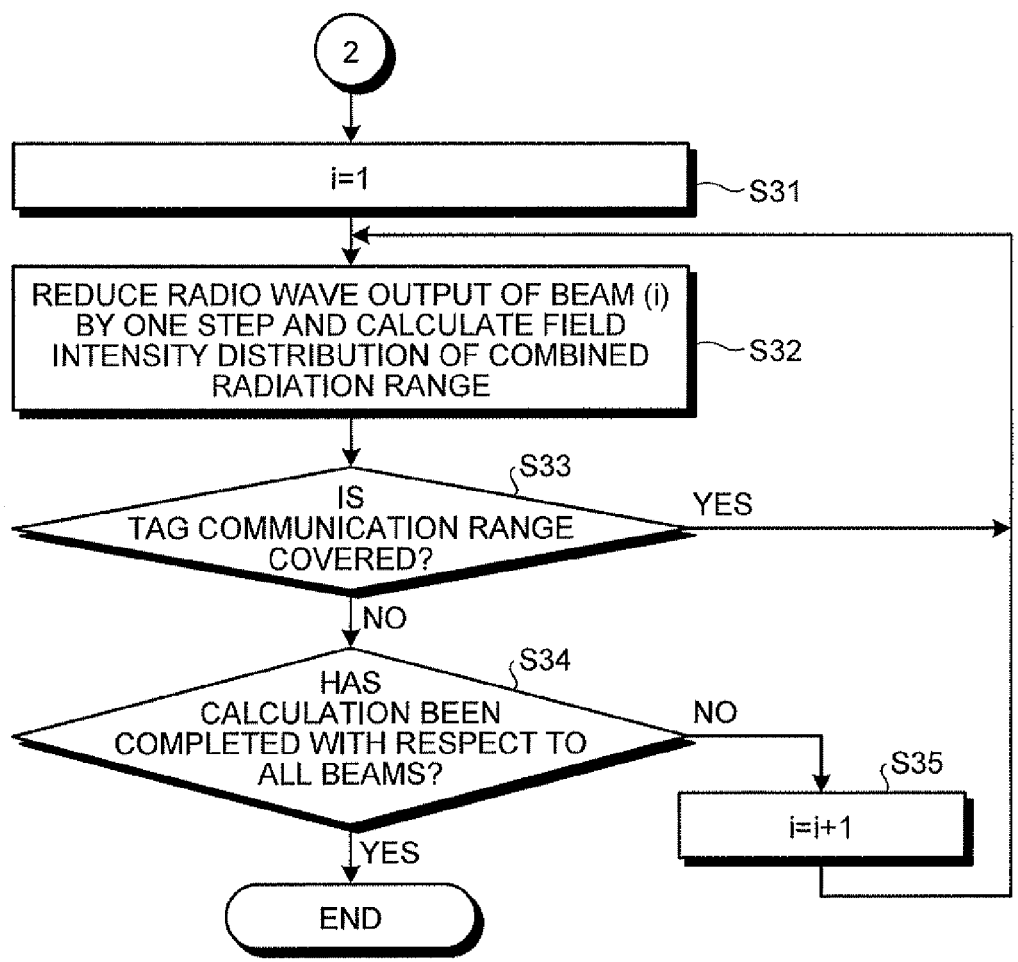
FIG. 8 is a flowchart of a process procedure of a radiation direction radio wave output determining process according to the second embodiment.

The process procedure of the radiation direction radio wave output determining process according to the second embodiment is explained below with reference to FIG. 8. FIG. 8 is a flowchart of the process procedure of the radiation direction radio wave output determining process according to the second embodiment.

The radiation direction radio wave output judging unit 24 that receives all of the radiation directions that are determined as radiation directions from the radiation direction determining unit 23 selects one of the radiation directions (step S31).

The radiation direction radio wave output judging unit 24 then calculates a field intensity distribution of the combined radiation range that is formed of the radiation ranges in all of the radiation directions, using, the selected radiation direction, the radio wave output value less one step, and using, for the remaining radiation directions other than the selected radiation direction, the maximum radio wave output value or the already determined radio wave output value (step S32).

Subsequently, on the basis of the calculated field intensity distribution of the combined radiation range, the radiation direction radio wave output judging unit 24 judges whether the combined radiation range covers the tag communication range and whether no no-communication area is caused in the tag communication range (step S33).

When it is determined that the combined radiation range covers the tag communication range and no no-communication area is caused in the tag communication range (YES at step S33), the radiation direction radio wave output determining unit 25 judges that there is a possibility that the radio wave output be further reduced and goes to step S32.

In contrast, when it is determined that the combined radiation range does not cover the tag communication range and a no-communication area is caused in the tag communication range (NO at step S33), the radiation direction radio wave output determining unit 25 judges that the limit of radio wave output value that does not causes any no-communication area in the tag communication range is exceeded, and determines, as the radio wave output value, the radio wave output value before reduction of the radio wave output value in the selected radiation direction.

Subsequently, the radiation direction radio wave output determining unit 25 judges whether the calculation for determining a radio wave output value is completed with respect to all of the radiation directions (step S34).

When it is judged that the calculation for determining a radio wave output value has been completed with respect to not all of the radiation directions (NO at step S34), the radiation direction radio wave output determining unit 25 selects the next radiation direction (step S35) and goes to step S32.

In contrast, when it is judged that the calculation for determining a radio wave output value has been completed with respect to all of the radiation directions (YES at step S34), the radiation direction radio wave output determining unit 25 sends the radio wave output values of all of the radiation directions as control information to the beam antenna 2a.

As described above, in the second embodiment, the radio wave control apparatus 1 detects the object without the RFID tag 5 in the radiation ranges to which the beam antenna 2a radiates radio waves in each of the radiation directions. The radio wave control apparatus 1 determines whether to employ radiation with respect to each of the radiation directions by removing radio directions from the radio directions such that radio waves are radiated over the entire tag communication range, in which the RFID tag 5 is communicable using radio waves, and that no no-communication area, which is caused when the radio waves are reflected on the detected object, is caused in the tag communication range. Furthermore, the radio wave control apparatus 1 determines a radio wave output in each of the radiation directions by reducing the radio wave output in each of the radiation directions from the maximum value on a predetermined-value basis such that radio waves are radiated over the entire tag communication range, in which the RFID tag 5 is communicable using radio waves, and that no no-communication area, which is caused when the radio waves are reflected on the detected object, is caused in the tag communication range.

Regarding this configuration, by determining whether to employ a radio wave radiation direction such that no no-communication area is caused in the tag communication range, the radio wave control apparatus 1 swiftly shifts the beam antenna 2a to the radiation direction in which the beam antenna 2a is communicable with the RFID tag 5. This allows the beam antenna 2a to efficiently communicate with the RFID tag 5.

By determining a radio wave output in each of the radiation directions such that no no-communication area is caused in the tag communication range, the radio wave control apparatus 1 can inhibit interference of radio waves in each of the radiation directions to the radiation ranges of other beam antennae. This achieves efficient communications while inhibiting the effect of multipath interference to other neighboring beam antennae.

By determining a radio wave output in each of the radiation directions such that no no-communication area is caused in the tag communication range, the radio wave control apparatus 1 can significantly reduce wasteful power consumption.

[c] Third Embodiment

The radio wave control apparatus 1 according to the second embodiment is explained regarding the case where it determines optimum radiation directions and radio wave outputs that cause no no-communication area in the tag communication range by gradually reducing radiation directions and radio wave outputs to be radiated in the radiation directions. The radio wave control apparatus 1 is not limited to this. The radio wave control apparatus 1 may determine optimum radiation directions and radio wave outputs to be radiated in the radiation directions that cause no no-communication area in the tag communication range by gradually increasing the radiation directions and radio wave outputs.

In a third embodiment of the present invention, a case is explained below where, by gradually increasing radiation directions and the radio wave outputs to be radiated in the radiation directions, the radio wave control apparatus 1 determines optimum radiation directions and radio wave outputs to be radiated in the radiation directions that cause no no-communication area in the tag communication range.

Figure 9:
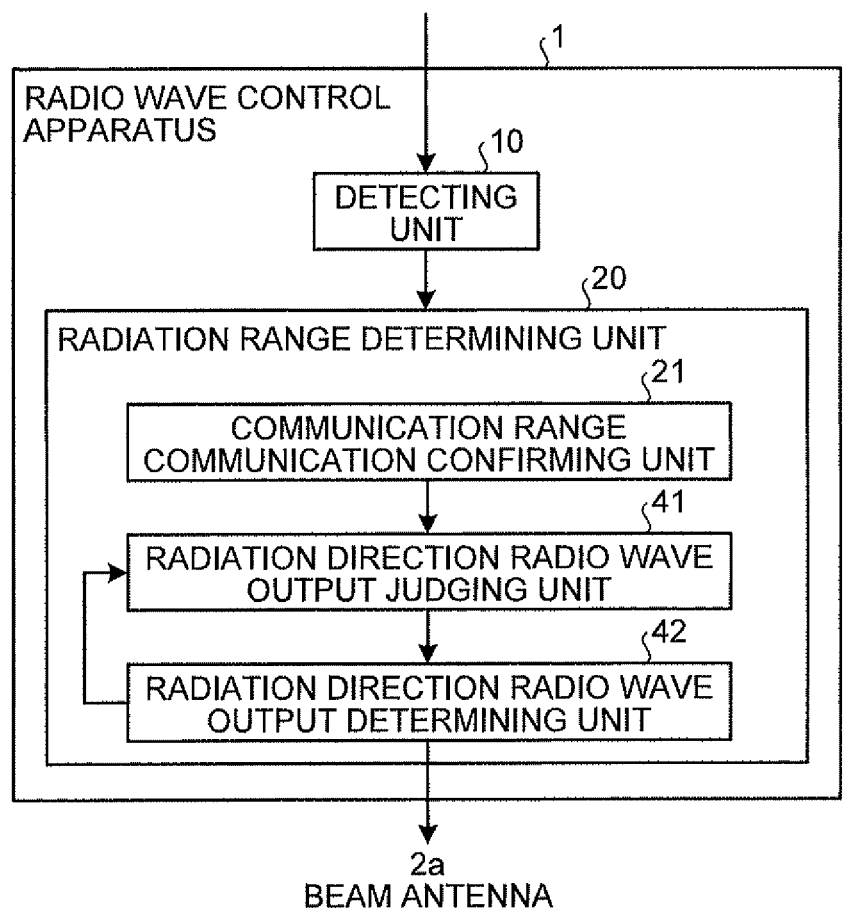
FIG. 9 is a function block diagram of a configuration of a radio wave control apparatus according to a third embodiment of the present invention.

A configuration of the radio wave control apparatus 1 according to the third embodiment is explained below. FIG. 9 is a function block diagram of the configuration of the radio wave control apparatus according to the third embodiment. By assigning the same numbers to the same elements as those of the radio wave control apparatus 1 represented in FIG. 5, the redundant explanation for the same elements and operations is omitted. The third embodiment is different from the second embodiment in that the radiation direction judging unit 22 and the radiation direction determining unit 23 are omitted from the radiation range determining unit 20, and changes to a radiation direction radio wave output judging unit 41 and a radiation direction radio wave output determining unit 42 are made.

Each time radiation directions from the radiation directions, in which radio waves are radiated, are increased, the radiation direction radio wave output judging unit 41 increases the radio wave output in the increased radiation direction from the minimum value step by step. Each time a radio wave output is increased, the radiation direction radio wave output judging unit 41 judges whether the radiation range in the tag communication range is increased on a predetermined level basis.

Specifically, the radiation direction radio wave output judging unit 41 sequentially selects radiation directions one by one from the radiation directions and calculates a field intensity distribution of a combined radiation range that is formed of the selected radiation direction and a radiation direction of which radio output value is already calculated by the radiation direction radio wave output determining unit 42, which is described below. The value of the radio wave output in the selected radiation direction is increased from the minimum value step by step.

The radio wave output is an intensity of radio waves. For example, one step may be 1 decibel (dB). If more fine adjustment is required, one step may be set to 0.5 dB. In contrast, if rough adjustment is required, one step may be set to 3 dB. However, one step is not limited to the above values.

On the basis of the calculated field intensity distribution, the radiation direction radio wave output judging unit 41 judges, after the increase of the radio wave output, whether the radiation range in the tag communication range is increased by a predetermined level or more from the radio wave output before the increase of the radio wave output, and sends the judgment result regarding the selected radiation direction to the radiation direction radio wave output determining unit 42.

On the basis of the judgment result regarding the selected radiation direction, the radiation direction radio wave output determining unit 42 determines a radio wave output value in the selected radiation direction.

Specifically, when the judgment result regarding the selected radiation direction represents that, after the increase of the radio wave output, the radiation range in the tag communication range is increased by the predetermined level or more from the radio wave output before the increase of the radio wave output, the radiation direction radio wave output determining unit 42 judges that the radiation range in the selected radiation direction is not saturated, and notifies the radiation direction radio wave output judging unit 41 that the radio wave output is to be further increased.

In contrast, when the judgment result regarding the selected radiation direction represents that, after the increase of the radio wave output, the radiation range in the tag communication range is not increased by the predetermined level or more from the radio wave output before the increase of the radio wave output, the radiation direction radio wave output determining unit 42 judges that the radiation range in the selected radiation direction is saturated, and determines the radio wave output value before the increase as the radio wave output in the selected radiation direction. If the judgment regarding the selected radiation direction is the first judgment, i.e., if the radio output value before the increase is 0, it may be judged that the radiation range is saturated due to other radiation directions and radio waves may not be radiated in the selected radiation direction.

Based on the field intensity distribution of the combined radiation range that is calculated by the radiation direction radio wave output judging unit 41, the radiation direction radio wave output determining unit 42 judges whether the combined radiation range covers the tag communication range and whether no no-communication area is caused in the tag communication range. When it is judged that the combined radiation range covers the tag communication range and that no no-communication area is caused in the tag communication range, the radiation direction radio wave output determining unit 42 sends the determined radio wave output value with respect to all of the radiation directions as control information to the beam antenna 2a.

In contrast, when it is judged that the combined radiation range does not cover the tag communication range, or that a no-communication area is caused in the tag communication range, the radiation direction radio wave output determining unit 42 judges whether all of the radiation directions have been selected. When it is judged that not all of the radiation directions have been selected, the radiation direction radio wave output determining unit 42 sends a message that urges selection of a radiation direction that has not been selected to the radiation direction radio wave output judging unit 41. In contrast, when it is judged that all of the radiation directions have been selected, a no-communication area is caused in the tag communication range, and thus, the radiation direction radio wave output determining unit 42, for example, displays the position of the no-communication area in the tag communication range on the monitor.

Figure 10:
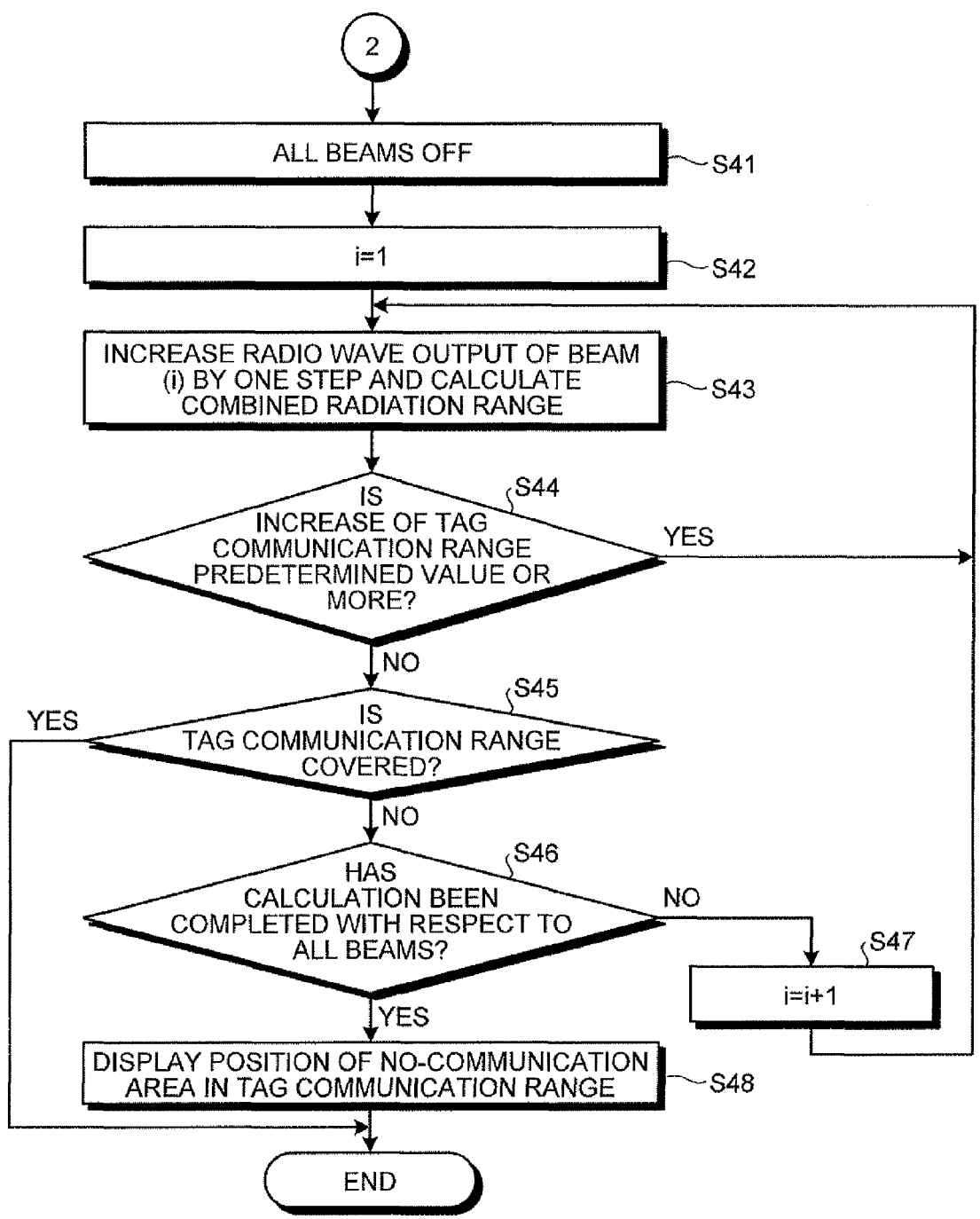
FIG. 10 is a flowchart of the process procedure of the radio wave control apparatus according to the third embodiment.

The process procedure of the radio wave control apparatus according to the third embodiment is explained below with reference to FIG. 10. FIG. 10 is a flowchart of the process procedure of the radio wave control apparatus according to the third embodiment.

The radiation direction radio wave output judging unit 41 that receives the message urging determination of a radiation direction from the communication range communication confirming unit 21 sets the radio wave outputs in all of the radiation directions to 0 (step S41).

The radiation direction radio wave output judging unit 41 then selects one radiation direction from the radiation directions (step S42).

The radiation direction radio wave output judging unit 41 then calculates a filed intensity distribution of a combined radiation range that is formed of the selected radiation direction and the radiation directions of which radio wave output is already determined (step S43). At this step, the radiation direction radio wave output judging unit 41 uses a value that is obtained by increasing by one step the radio wave output in the selected radiation direction.

On the basis of the calculated field intensity distribution of the combined radiation range, the radiation direction radio wave output judging unit 41 judges whether, after the increase of the radio wave output, the radiation range in the tag communication range is increased by the predetermined level or more from the radio wave output before the increase of the radio wave output (step S44).

When it is judged that, after the increase of the radio wave output, the radiation range in the tag communication range is increased by the predetermined level or more from the radio wave output before the increase of the radio wave output (YES at step S44), the radiation direction radio wave output determining unit 42 judges that the radiation range in the selected radiation direction is not saturated and goes to step S43.

In contrast, when it is judged that, after the increase of the radio wave output, the radiation range in the tag communication range is not increased by the predetermined level or more from the radio wave output before the increase of the radio wave output (NO at step S44), the radiation direction radio wave output determining unit 42 judges that the radiation range in the selected radiation direction is saturated and determines the radio wave output value before the increase as the radio wave output in the selected radiation direction. If the radio wave output value before the increase is 0, the radiation direction radio wave output determining unit 42 may judge that the radiation rage is already saturated due to other radiation directions and radio waves may not radiate the radio waves in the selected radiation direction.

Subsequently, on the basis of the field intensity distribution of the combined radiation range that is calculated by the radiation direction radio wave output judging unit 41, the radiation direction radio wave output determining unit 42 judges whether the combined radiation range covers the tag communication range and whether no no-communication range is caused in the tag communication range (step S45).

When it is judged that the combined radiation range covers the tag communication range and that no no-communication area is caused in the tag communication range (YES at step S45), the radiation direction radio wave output determining unit 42 sends the determined radio wave output values of all of the radiation directions as control information to the beam antenna 2a, and completes the process.

in contrast, when it is judged that the combined radiation range does not cover the tag communication range, or that a no-communication area is caused in the tag communication range (NO at step S45), the radiation direction radio wave output determining unit 42 judges whether all of the radiation directions have been selected (step S46).

When it is judged that not all of the radiation directions have been selected (NO at step S46), the radiation direction radio wave output determining unit 42 selects the next radiation direction (step S47) and goes to step S43.

When it is judged that all of the radiation directions have been selected (YES at step S46), the radiation direction radio wave output determining unit 42 displays on the monitor the position of the no-communication area in the tag communication range (step S48) and completes the process.

As described above, in the third embodiment, the radio wave control apparatus 1 detects the object without the RFID tag in the radiation range to which the beam antenna 2a radiates radio waves in each of the radiation directions. The radio wave control apparatus 1 determines a radio wave output in each radiation direction by increasing the radio wave output from the minimum value on the predetermined-value basis such that radio waves are radiated over the entire tag communication range, in which the RFID tag 5 is communicable using radio waves, and that no no-communication area, which is caused when the radio waves are reflected on the detected object, is caused in the tag communication range. In other words, the radio wave control apparatus 1 determines the radiation direction of which radio wave output is determined as the radiation direction in which radio waves are radiated for communications with the RFID tag 5.

Regarding this configuration, by determining a radiation direction while determining an output of radio waves in each of the radiation directions such that no no-communication area is caused in the tag communication range, the radio wave control apparatus 1 can perform efficient adjustment.

Regarding this configuration, by determining whether to employ a radio wave radiation direction such that no no-communication area is caused in the tag communication range, the radio wave control apparatus 1 can swiftly shift the radio wave radiating unit 2 to the radiation direction in which the beam antenna 2a is communicable with the RFID tag 5. This allows the beam antenna 2a to efficiently communicate with the RFID tag 5.

Furthermore, by determining a radio wave output of each of the radio directions such that no no-communication area is caused in the communication range, the radio wave control apparatus 1 can establish communications in which the effect of interference to other neighboring RFID systems is inhibited.

By determining an output of radio waves in each of the radiation directions such that no no-communication area is caused in the tag communication range, the radio wave control apparatus 1 can significantly reduce wasteful power consumption.

Figure 11:
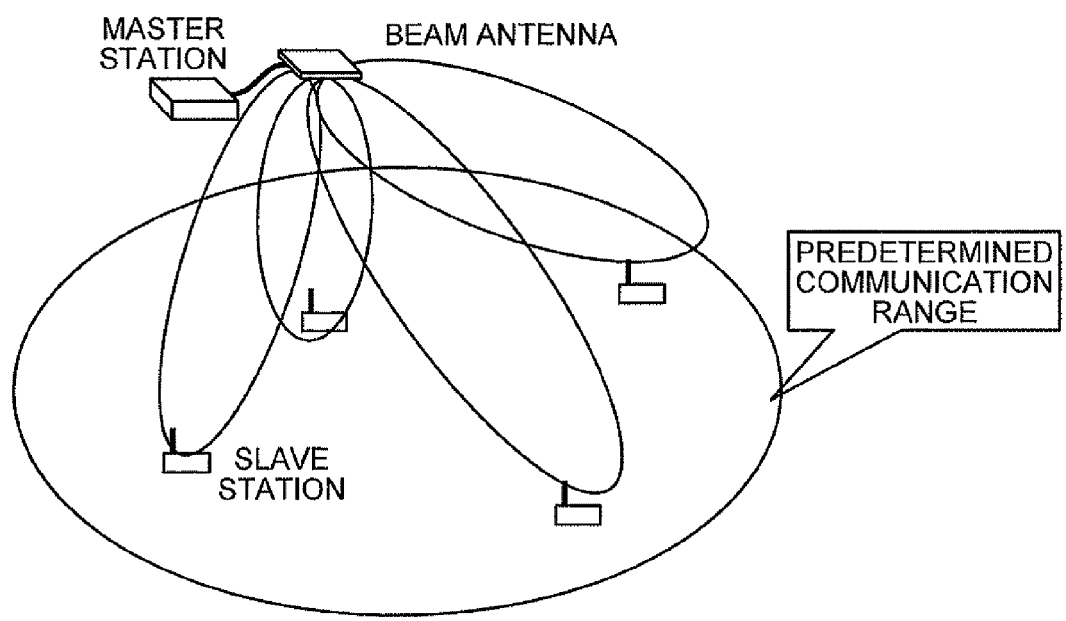
FIG. 11 is a diagram representing other use of the radio wave control system.
Figure 12:
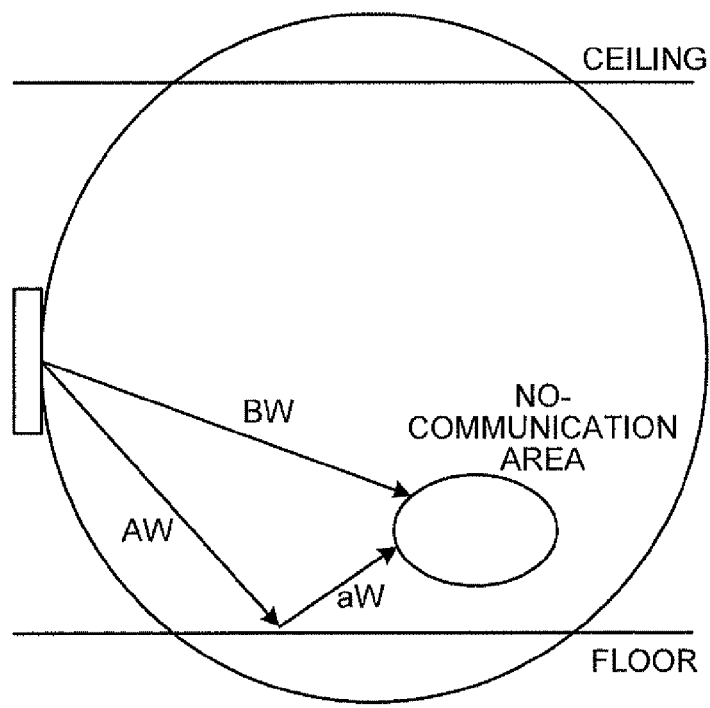
FIG. 12 is a diagram of a conventional radio wave control system using a non-directional antenna.
Figure 13:
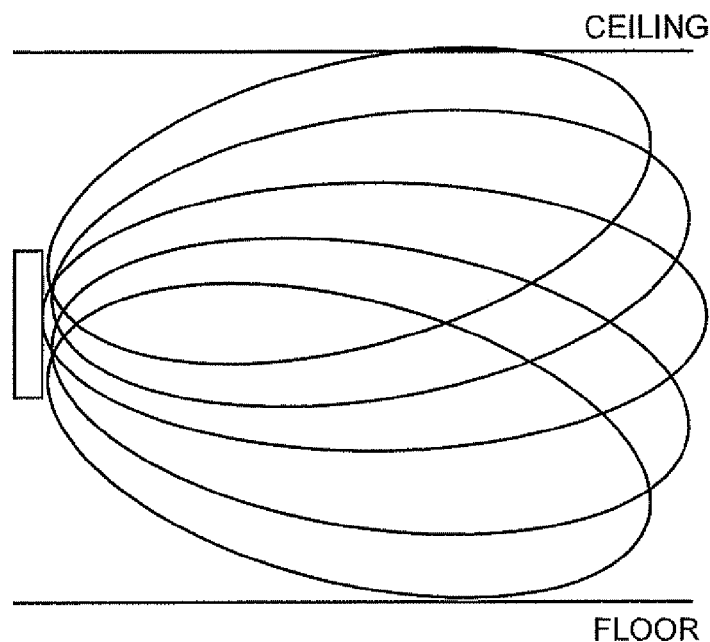
FIG. 13 is a diagram of a conventional radio wave control system using a variable beam antenna.

The radio wave control system 9 according to the second embodiment is explained as a system in which, for example, the radio wave control apparatus 1 controls the beam antenna 2a that communicates with the RFID tag 5. However, the system is not limited to this. FIG. 11 is a diagram of another use of radio wave control systems. In the radio wave control system illustrated in FIG. 11, a master station controls a beam antenna that communicates with slave stations. If the master station includes the radio wave control apparatus 1, the radio wave control apparatus 1 can determine a radio wave radiation direction such that no no-communication area is caused in a predetermined communication range and allow the beam antenna to efficiently communicate with the slave stations.

In the second embodiment, the radiation direction determining process performed by the radiation direction judging unit 22 and the radiation direction determining unit 23 determines a radiation direction from the radiation directions such that no no-communication area is caused in the tag communication range, and then the radio wave output determining process performed by the radiation direction radio wave output judging unit 24 and the radiation direction radio wave output determining unit 25 determines a radio wave output value in the radiation direction, which is determined by the radiation direction determining process, such that no no-communication area is caused in the tag communication range. Alternatively, only any one of the radiation direction determining process and the radiation direction radio wave output determining process may be performed or they may be performed inversely.

The radio wave control apparatus, the radio wave control system, and the radio wave control method according to the embodiment leads to an effect that, even under the circumstances where the radio wave radiating unit having high directionality is used and no no-communication area is caused in the predetermined communication range, communications with the communication target device can be established using radio waves from the radio wave radiating unit having high directionality.

The embodiments of the present invention are explained above. However, the embodiments do not limit the scope of technical concepts of the present invention. Various embodiments may be made within the technical scope defined in the claims. The effects of the embodiments are not limited to those described above, as well.

The elements of the radio wave control apparatus 1 illustrated in the drawings are functional concepts and thus are not necessarily configured physically as illustrated in the drawings and the embodiments of each apparatus are not limited to those illustrated in the drawings.

Each process function of the radio wave control apparatus 1 may be achieved entirely or partially by a central processing unit (CPU) (or a micro computer, such as a micro processing unit (MPU) or a micro controller unit (MCU)) and a program that is analyzed and executed by the CPU (or a micro computer, such as an MPU or a MCU), or be implemented as wired logic hardware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio wave control apparatus comprising:
   a detecting unit that detects an object, other than a communication target device, in a radiation range to which a radio wave radiating unit radiates predetermined radio waves in each of a plurality of radiation directions;
   a radio wave output judging unit that reduces a radio wave output in one radiation direction of the radiation directions from a maximum value on a predetermined-value basis, and judges whether a radiation range covering the radiation direction using the reduced radio wave output does not cover the entire communication range in which the communication target device is communicable using the predetermined radio waves, or whether no-communication area is caused in the communication range;
   a radio wave output determining unit that, when the radio wave output judging unit judges that the radiation range does not cover the entire communication range, or that the no-communication area that is caused when the predetermined radio waves reflected on the object is caused in the communication range, determines the radio wave output before the reduction as the radio wave output in the radiation direction and determines the radio wave output in each of the radiation directions; and
   a radiation range determining unit that determines radiation direction in which the radio wave radiating unit radiates radio waves among a plurality of radiation directions such that the predetermined radio waves are radiated over entire communication range in which the communication target device is communicable using the predetermined radio waves, and no no-communication area that is caused when the predetermined radio waves reflected on the object is caused in the communication range.

2. The radio wave control apparatus according to claim 1, further comprising:
   a radiation range determining unit that determines whether to employ radiation with respect to each of the radiation directions by removing at least one radiation direction from the radiation directions.

3. The radio wave control apparatus according to claim 2, wherein the radiation range determining unit includes
   a radiation direction judging unit that judges whether a radiation range in remaining radiation directions other than the radiation direction, which is removed from the radiation directions, covers the entire communication range, and whether no no-communication area is caused in the communication range; and
   a radiation direction determining unit that, when the radiation direction judging unit judges that the radiation range covers the entire communication range and that no no-communication area is caused in the communication range, determines the remaining radiation directions other than the radiation direction, which is removed from the radiation directions, as radiation directions in which the radio wave radiating unit radiates radio waves to communicate with the communication target device.

4. The radio wave control apparatus according to claim 1, wherein the communication target device is an RFID tag.

5. A radio wave control apparatus comprising:
   a detecting unit that detects an object, other than a communication target device, in a radiation range to which a radio wave radiating unit radiates predetermined radio waves in each of a plurality of radiation directions;
   a radio wave output judging unit that increases a radio wave output in one radiation direction of the radiation directions from a minimum value on a predetermined-value basis, and judges whether, after the increase, a radiation range covering the radiation direction using the increased radio wave output is increased by a predetermined level or more from the radiation range before the increase;
   a radio wave output determining unit that, when the radio wave output judging unit judges that the radiation range after the increase is not increased by the predetermined level or more from the radiation range before the increase, determines the radio wave output before the increase as the radio wave output in the radiation direction and determines the radio wave output in each of the radiation directions; and
   a radiation range determining unit that determines radiation direction in which the radio wave radiating unit radiates radio waves among a plurality of radiation directions such that the predetermined radio waves are radiated over entire communication range in which the communication target device is communicable using the predetermined radio waves, and no no-communication area that is caused when the predetermined radio waves reflected on the object is caused in the communication range.

6. The radio wave control apparatus according to claim 5, wherein, when the radio wave output before the increase is 0, the radio wave output determining unit determines not to radiate radio waves in the radiation direction.

7. The radio wave control apparatus according to claim 5, wherein the radiation range determining unit determines whether to employ radiation with respect to each of the radiation directions by removing at least one radiation direction from the radiation directions.

8. The radio wave control apparatus according to claim 7, wherein the radiation range determining unit includes
   a radiation direction judging unit that judges whether a radiation range in remaining radiation directions other than the radiation direction, which is removed from the radiation directions, covers the entire communication range, and whether no no-communication area is caused in the communication range; and
   a radiation direction determining unit that, when the radiation direction judging unit judges that the radiation range covers the entire communication range and that no no-communication area is caused in the communication range, determines the remaining radiation directions other than the radiation direction, which is removed from the radiation directions, as radiation directions in which the radio wave radiating unit radiates radio waves to communicate with the communication target device.

9. A radio wave control system comprising:
   an antenna that radiates predetermined radio waves in a plurality of radiation directions;
   a radio wave control apparatus that is connected to the antenna; and
   a measuring device that is connected to the radio wave control apparatus and measures a distance to an object, wherein the radio wave control apparatus includes
- a detecting unit that detects an object, other than a communication target device, in a radiation range to which the antenna radiates the predetermined radio waves in each of a the radiation directions;
- a radio wave output judging unit that reduces a radio wave output in one radiation direction of the radiation directions from a maximum value on a predetermined-value basis, and judges whether a radiation range covering the radiation direction using the reduced radio wave output does not cover the entire communication range in which the communication target device is communicable using the predetermined radio waves, or whether no-communication area is caused in the communication range; and
- a radio wave output determining unit that, when the radio wave output judging unit judges that the radiation range does not cover the entire communication range, or that the no-communication area that is caused when the predetermined radio waves reflected on the object is caused in the communication range, determines the radio wave output before the reduction as the radio wave output in the radiation direction and determines the radio wave output in each of the radiation directions.

10. A radio wave control method comprising:
- detecting an object, other than a communication target device, in a radiation range to which a radio wave radiating unit radiates predetermined radio waves in each of a plurality of radiation directions;
- determining radiation direction in which the radio wave radiating unit radiates radio waves among a plurality of radiation directions such that the predetermined radio waves are radiated over entire communication range in which the communication target device is communicable using the predetermined radio waves, and no no-communication area that is caused when the predetermined radio waves reflected on the object is caused in the communication range;
- reducing a radio wave output in the radiation direction from a maximum value on a predetermined-value basis;
- judging whether a radiation range covering the radiation direction using the reduced radio wave output does not cover the entire communication range in which the communication target device is communicable using the predetermined radio waves, or whether the no-communication area is caused in the communication range; and
- when the judging judges that the radiation range does not cover the entire communication range, or that the no-communication area that is caused when the predetermined radio waves reflected on the object is caused in the communication range, determining the radio wave output before the reduction as the radio wave output in the radiation direction.

11. A radio wave control system comprising:
- an antenna that radiates predetermined radio waves in a plurality of radiation directions;
- a radio wave control apparatus that is connected to the antenna; and
- a measuring device that is connected to the radio wave control apparatus and measures a distance to an object, wherein the radio wave control apparatus includes
- a detecting unit that detects an object, other than a communication target device, in a radiation range to which the antenna radiates the predetermined radio waves in each of a the radiation directions;
- a radio wave output judging unit that increases a radio wave output in one radiation direction of the radiation directions from a minimum value on a predetermined-value basis, and judges whether, after the increase, a radiation range covering the radiation direction using the increased radio wave output is increased by a predetermined level or more from the radiation range before the increase;
- a radio wave output determining unit that, when the radio wave output judging unit judges that the radiation range after the increase is not increased by the predetermined level or more from the radiation range before the increase, determines the radio wave output before the increase as the radio wave output in the radiation direction and determines the radio wave output in each of the radiation directions; and
- a radiation range determining unit that determines radiation direction in which the radio wave radiating unit radiates radio waves among a plurality of radiation directions such that the predetermined radio waves are radiated over entire communication range in which the communication target device is communicable using the predetermined radio waves, and no no-communication area that is caused when the predetermined radio waves reflected on the object is caused in the communication range.

12. A radio wave control method comprising:
- detecting an object, other than a communication target device, in a radiation range to which a radio wave radiating unit radiates predetermined radio waves in each of a plurality of radiation directions;
- increasing a radio wave output in one radiation direction of the radiation directions from a minimum value on a predetermined-value basis;
- judging whether, after the increase, a radiation range covering the radiation direction using the increased radio wave output is increased by a predetermined level or more from the radiation range before the increase;
- when the judging judges that the radiation range after the increase is not increased by the predetermined level or more from the radiation range before the increase, determining the radio wave output before the increase as the radio wave output in the radiation direction and determining the radio wave output in each of the radiation directions; and
- determining radiation direction in which the radio wave radiating unit radiates radio waves among a plurality of radiation directions such that the predetermined radio waves are radiated over entire communication range in which the communication target device is communicable using the predetermined radio waves, and no no-communication area that is caused when the predetermined radio waves reflected on the object is caused in the communication range.

* * * * *